US011001484B2

(12) United States Patent
VanValkenburgh (10) Patent No.: US 11,001,484 B2
(45) Date of Patent: May 11, 2021

(54) AXLE HOLDER FOR MOTORCYCLE STAND (71) Applicant: Pit Bull Products, Inc., Huntsville, AL (US)

(72) Inventor: Charles VanValkenburgh, Hunstsville, AL (US)

(73) Assignee: Pit Bull Products, Inc., Huntsville, AL (US)

( * ) Notice: Subject to any disclaimer, the term of this patent is extended or adjusted under 35 U.S.C. 154(b) by 234 days.

(21) Appl. No.: 16/408,520

(22) Filed: May 10, 2019

(65) Prior Publication Data

US 2020/0354205 A1 Nov. 12, 2020

(51) Int. Cl.
*B66F 5/00* (2006.01)
*B25H 1/00* (2006.01)
*B62H 3/00* (2006.01)
*B60S 5/00* (2006.01)

(52) U.S. Cl.
CPC ............ *B66F 5/00* (2013.01); *B25H 1/0014* (2013.01); *B60S 5/00* (2013.01); *B62H 3/00* (2013.01)

(58) Field of Classification Search
CPC . B66F 15/00; B66F 5/00; B66F 3/005; B25H 1/00; B25H 1/0007; B25H 1/0014; B62H 3/00; B62H 3/04; B62H 3/10; B60S 5/00
See application file for complete search history.

(56) References Cited

U.S. PATENT DOCUMENTS

| | | | | |
|---|---|---|---|---|
| 1,297,609 A | * | 3/1919 | Tschudin | 248/222.14 |
| 1,891,048 A | * | 12/1932 | Keefe | F16B 21/10 248/222.14 |
| 1,897,913 A | * | 2/1933 | Pudliner | F16B 13/00 248/222.14 |
| 4,907,771 A | * | 3/1990 | Wang | A47G 25/06 248/222.14 |
| 5,088,671 A | * | 2/1992 | Chen | B62J 11/00 248/222.14 |
| 5,286,130 A | * | 2/1994 | Mueller | B66C 1/66 294/215 |
| 6,244,549 B1 | * | 6/2001 | Ching | A47B 96/028 211/105.1 |
| 6,488,157 B2 | * | 12/2002 | Chen | B62H 3/00 211/20 |
| 7,000,901 B1 | * | 2/2006 | VanValkenburgh | B66F 15/00 254/131 |
| 2004/0099851 A1 | * | 5/2004 | Carnahan | B66F 15/00 254/131 |
| 2013/0200316 A1 | * | 8/2013 | VanValkenburgh | B62H 3/06 254/131 |

* cited by examiner

*Primary Examiner* — Tyrone V Hall, Jr.

(74) *Attorney, Agent, or Firm* — Adam K. Sacharoff; Much Shelist, P.C.

(57) ABSTRACT

The present invention is directed to a motorcycle axle holder assembly device for use with a motorcycle stand. The assembly device includes a plate and a cylindrical section positioned on the plate. The cylindrical section has an opening configured to be attached to a cylindrical member extending from the motorcycle stand. The device has a generally C shaped longitudinal opening with a base adjacent to the cylindrical section and a pair of arcuate arms extending from the base. The C shaped longitudinal opening is configured to suspend an end of the motorcycle axle off the surface when inserted therethrough.

15 Claims, 7 Drawing Sheets

AXLE HOLDER FOR MOTORCYCLE STAND

BACKGROUND OF THE INVENTION

The present invention relates generally to motorcycle stands. More particularly, this invention pertains to a device that provides a storage location for the motorcycle axle and related hardware while the motorcycle wheel is removed from the motorcycle. It keeps the motorcycle axle and related hardware relatively dean by keeping them off the ground and in an easy-to-find designated area. The invention attaches to the motorcycle stand on left or right side in a semi-permanent fashion.

There are motorcycle stands used for raising the front or rear wheel of the motorcycle off the ground for maintenance. With the motorcycle front or rear wheel off the ground and the motorcycle supported by the motorcycle stand, the respective front or rear wheel can be removed. Once the wheel is removed the axle and related hardware such as wheel spacers, axle nuts, washers and/or axle end screws would otherwise not have a clean, consistent storage location. When disassembling/reassembling mechanical systems such as a motorcycle, a clean and consistent storage location can save time and aid in preventing parts from being omitted during reassembly.

One common prior art method involves a cylindrical peg mounted to the motorcycle stand. In some instances, the peg is mounted permanently and in others it is mounted semi-permanently. The permanently mounted versions are mounted at a fixed position while the semi-permanent ones generally provide some degree of angle adjustability in one plane. A drawback of the cylindrical peg device is that it can only hold a hollow axle since the peg is inserted into the axle.

Another prior art method is comprised of a section of either a tube or trough that a motorcycle axle can rest in. This method tends to put more surface area of the holder in contact with the axle and has a tendency of collecting grease and/or dirt that could be transferred to the axle. This method can support hollow and solid motorcycle axles.

Motorcycle axles vary in length, diameter, configuration such as head shape (i.e., cylindrical vs. hex head), and whether they are solid vs. hollow. Related hardware for motorcycle axles also varies and can include a combination of wheel spacers, nuts, washers and/or an end screw. Prior art methods do not address how to collectively hold the motorcycle axle and related hardware. The invention addresses this regardless of size and configuration.

BRIEF SUMMARY OF THE INVENTION

The present invention is one device that attaches to a motorcycle stand and holds the motorcycle axle and all related hardware when the motorcycle wheel is being removed from the motorcycle. It keeps these items in a consistent place, so they do not get omitted when the wheel is being re-installed. It also keeps them off the ground to generally keep them from getting dirty before they are re-installed.

The invention captures the motorcycle axle with two arms that allow the axle to be cantilevered such that it exerts an upward and downward force simultaneously thus applying enough force to prevent the axle from moving. "V" shaped cuts in the two arms force the axle to center itself to prevent it from rolling out of containment by the arms.

BRIEF DESCRIPTION OF THE DRAWINGS

A fuller understanding of the foregoing may be had by reference to the accompanying drawings, wherein.

DETAILED OF THE INVENTION

Referring now to FIGS. 1-6, the present invention is an axle holder assembly device 100 that attaches to a motorcycle stand 10 and serves as a holder for the motorcycle axle 15 and its related parts 20, including wheel spacer(s) and/or an axle end screw. It can be used on the left or right side of a front or rear motorcycle stand.

The axle holder assembly device 100 consists of a flat or relatively flat plate 110 with an open cylindrical section or tube 120 attached in place by welding or other means. The tube 120 has a threaded hole 125 to accept a fixing screw 130, which when screwed into place secures the device 100 to the motorcycle stand 10. The axle holder assembly device 100 is attached to the motorcycle stand by installing it onto a cylindrical member 25 extending from the motorcycle stand 10 then tightening the fixing screw 130. When in place the axle holder assembly device 100 is ready for use.

Figure 1:
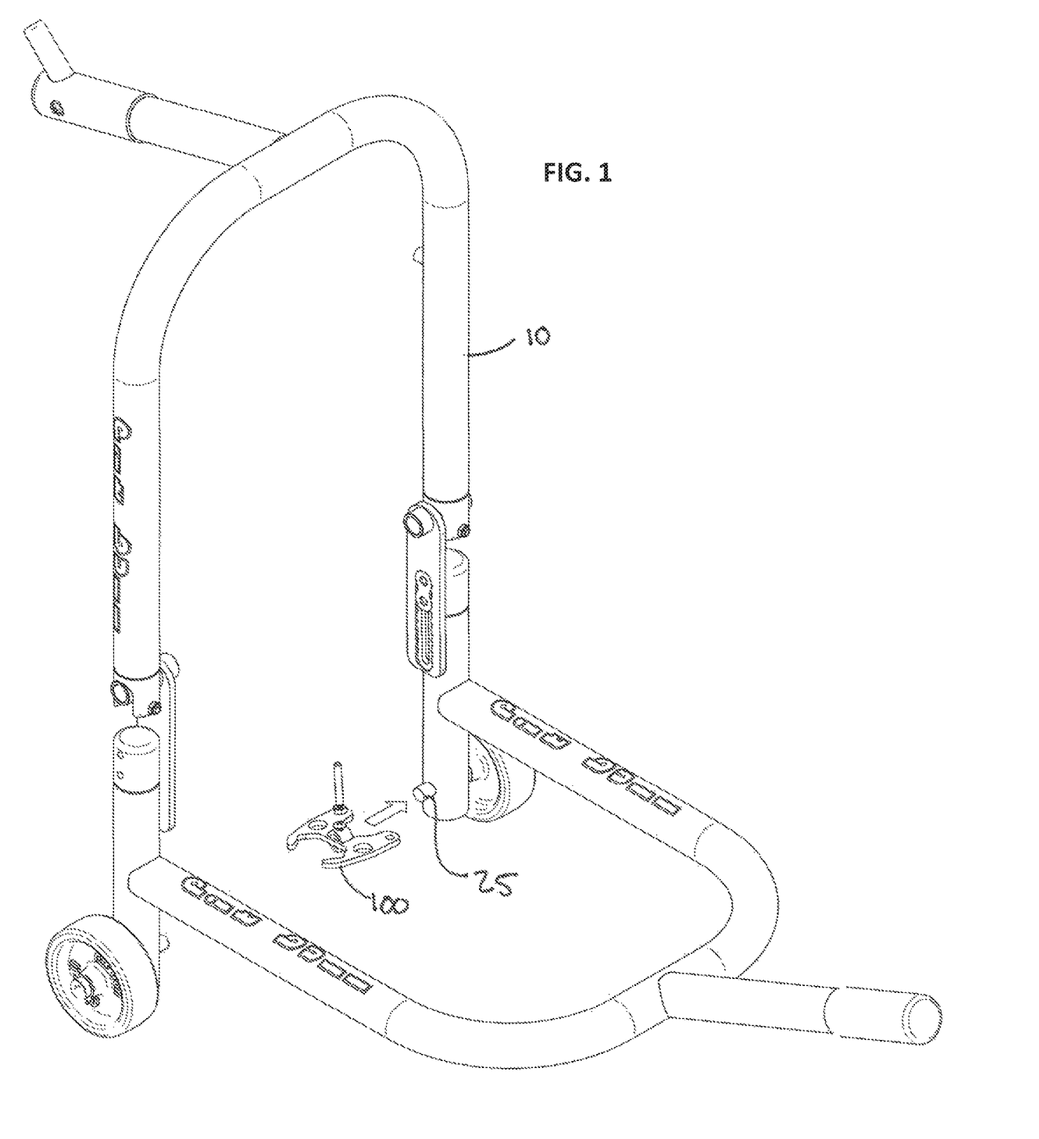
FIG. 1 is a view showing the invention, an axle holder, being installed onto a motorcycle stand.
Figure 2:
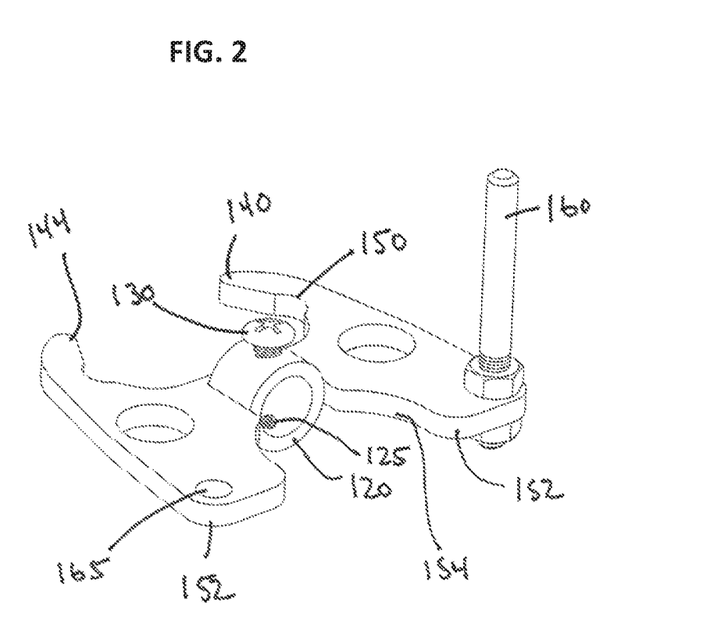
FIG. 2 is a view showing the axle holder.
Figure 3:
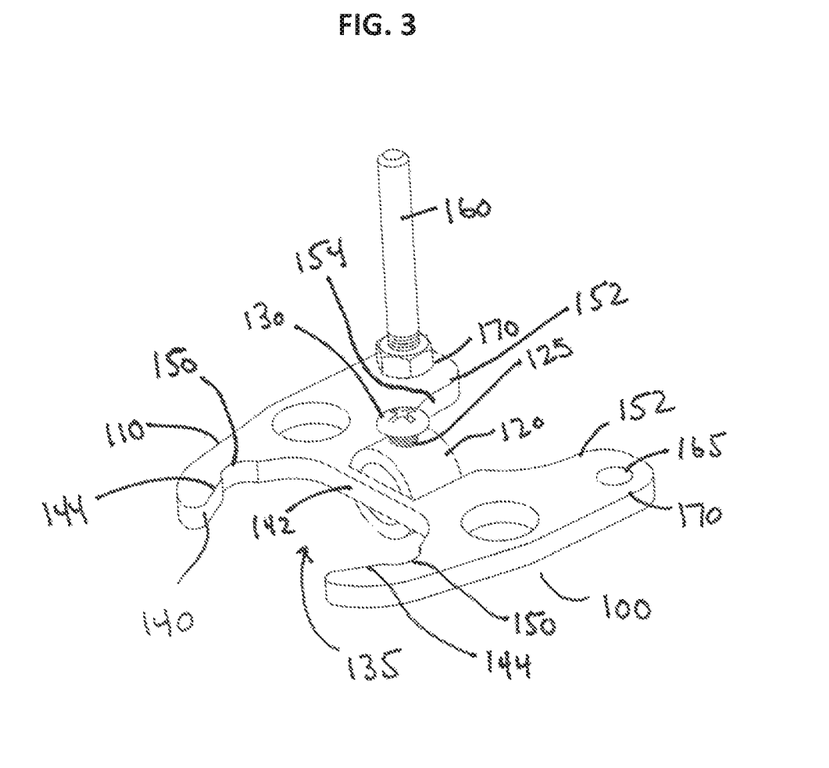
FIG. 3 is another view showing the axle holder.
Figure 4:
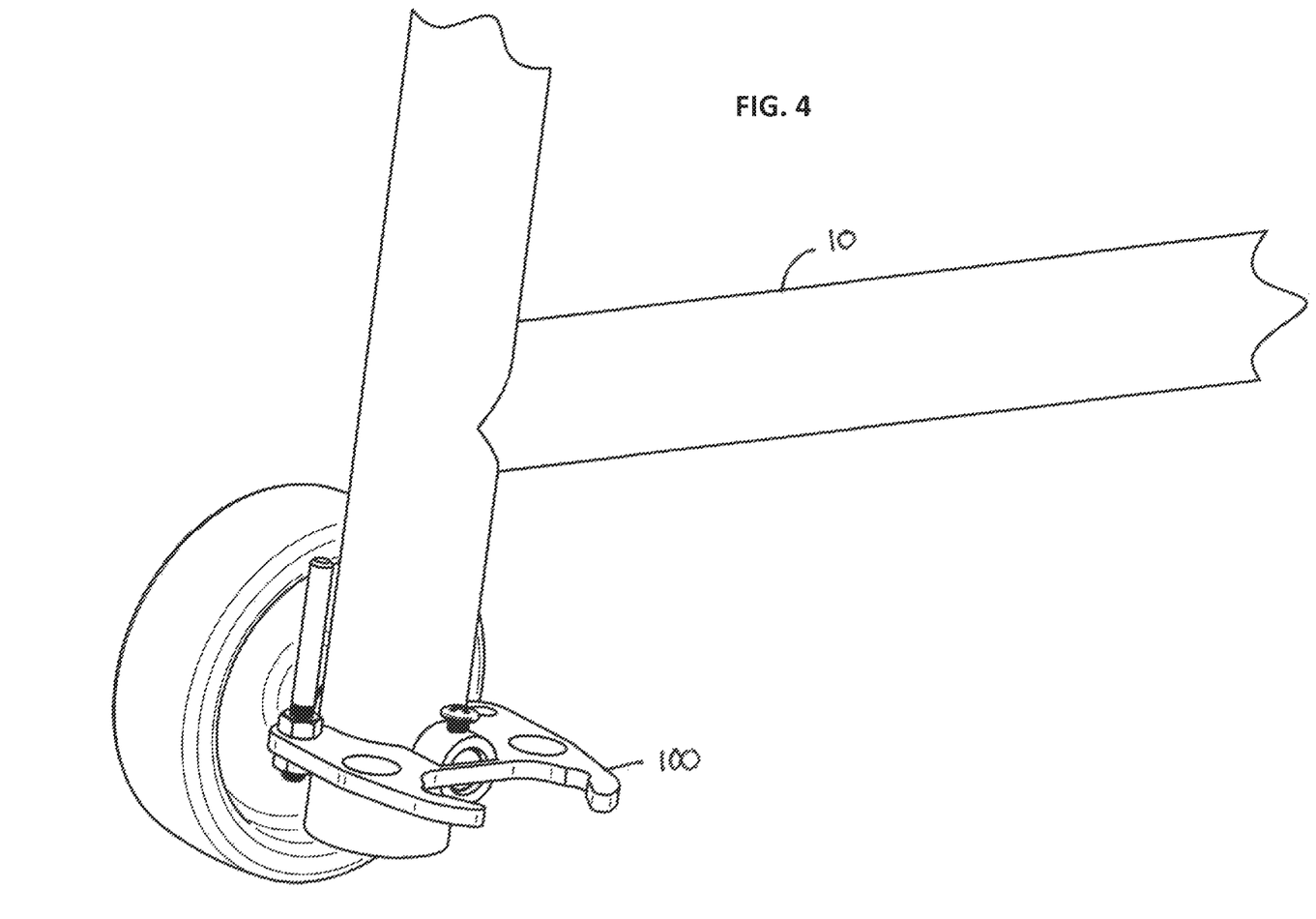
FIG. 4 is an enlarged view of the axle holder assembly installed onto a motorcycle stand.
Figure 5:
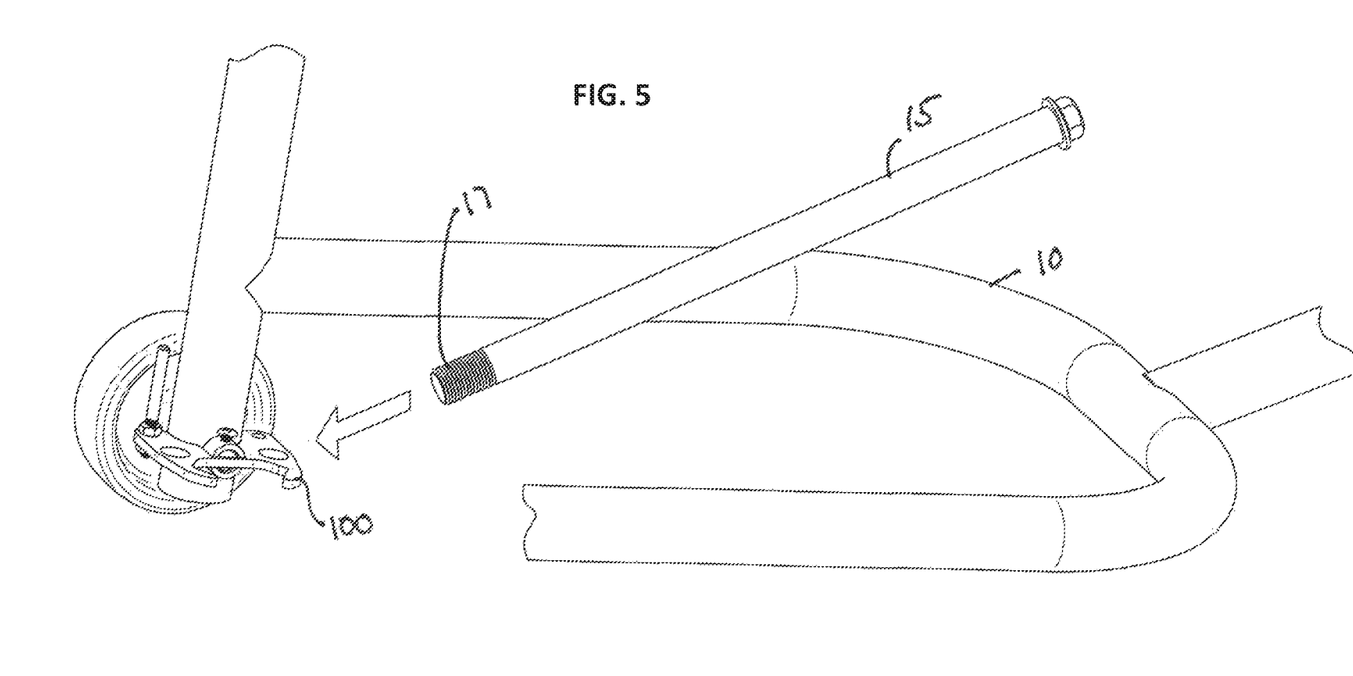
FIG. 5 is a view showing a motorcycle axle being inserted into the axle holder with the axle holder attached to a motorcycle stand.
Figure 6:
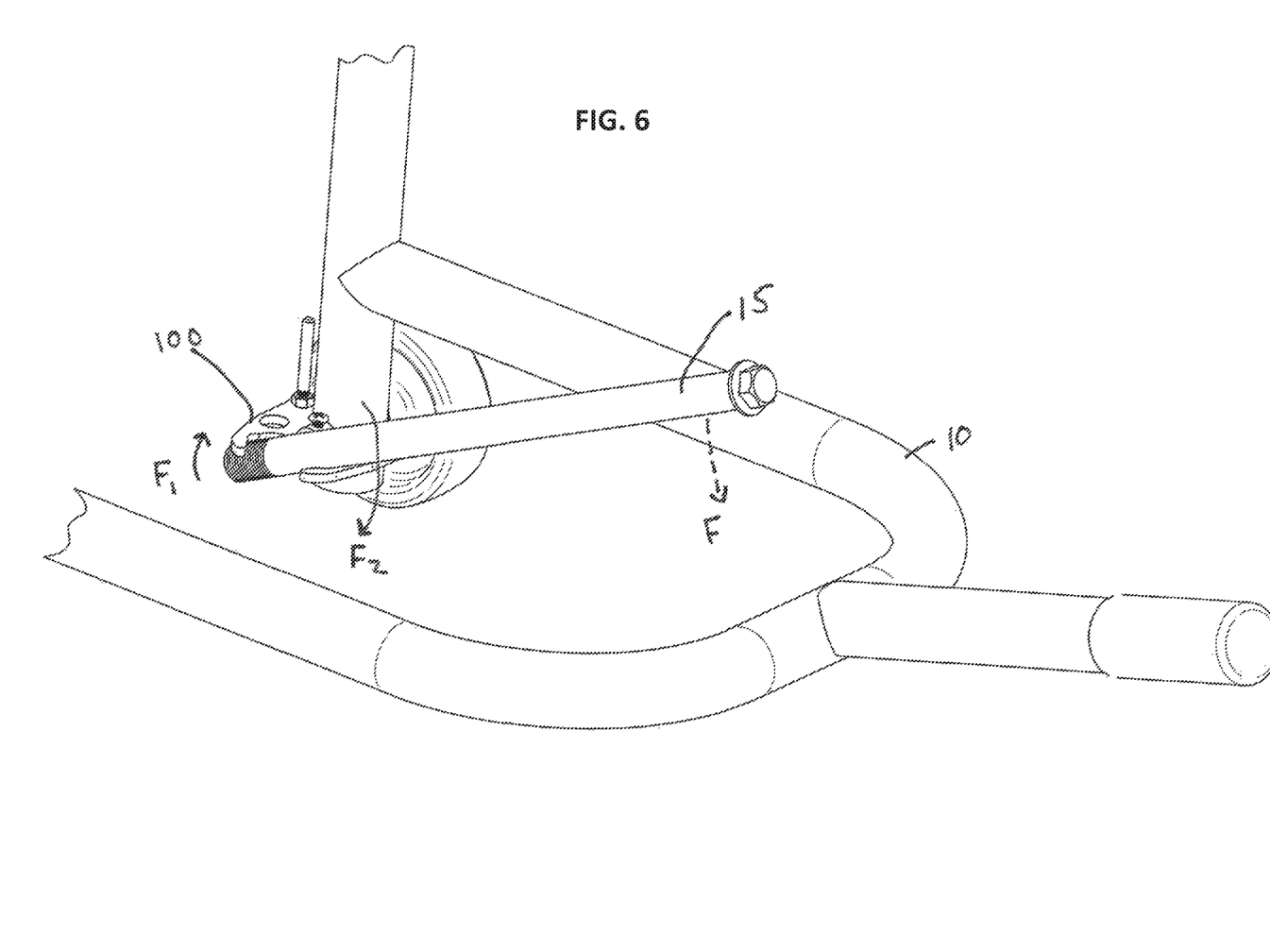
FIG. 6 is a view showing the axle held by the axle holder.

The axle holder assembly device 100 uniquely holds the motorcycle axle 15, as shown in FIG. 6, by using the weight of the axle 15 to simultaneously apply upward force to the axle holder assembly device 100 near the end 17 of the axle 15 and a downward force to the axle holder assembly device 100 away from the end 17 of the axle 15. This has two advantages: 1) the axle 15 is contacted with a minimal amount of surface area which reduces the amount of dirt or debris that comes into contact with the axle, and 2) the axle holder assembly device 100 is able to hold an axle whether it is solid or hollow since it does not utilize a pin or peg that inserts into the axle.

The axle holder assembly device 100 includes an opening 135 into which the axle 15 is inserted and held. The opening 135 is generally "C" shaped 140 with a base 142 adjacent to the tube 120 and arcuate arms 144 extending from the base 142. Each arm 144 of the "C" shape 140 opening 135 consists generally of a "V" shape surfaced edge 150 facing inwardly towards each other. The "V" shape edge 150 center the axle and prevent it from rolling out the side of the "C" shape opening.

Figure 7:
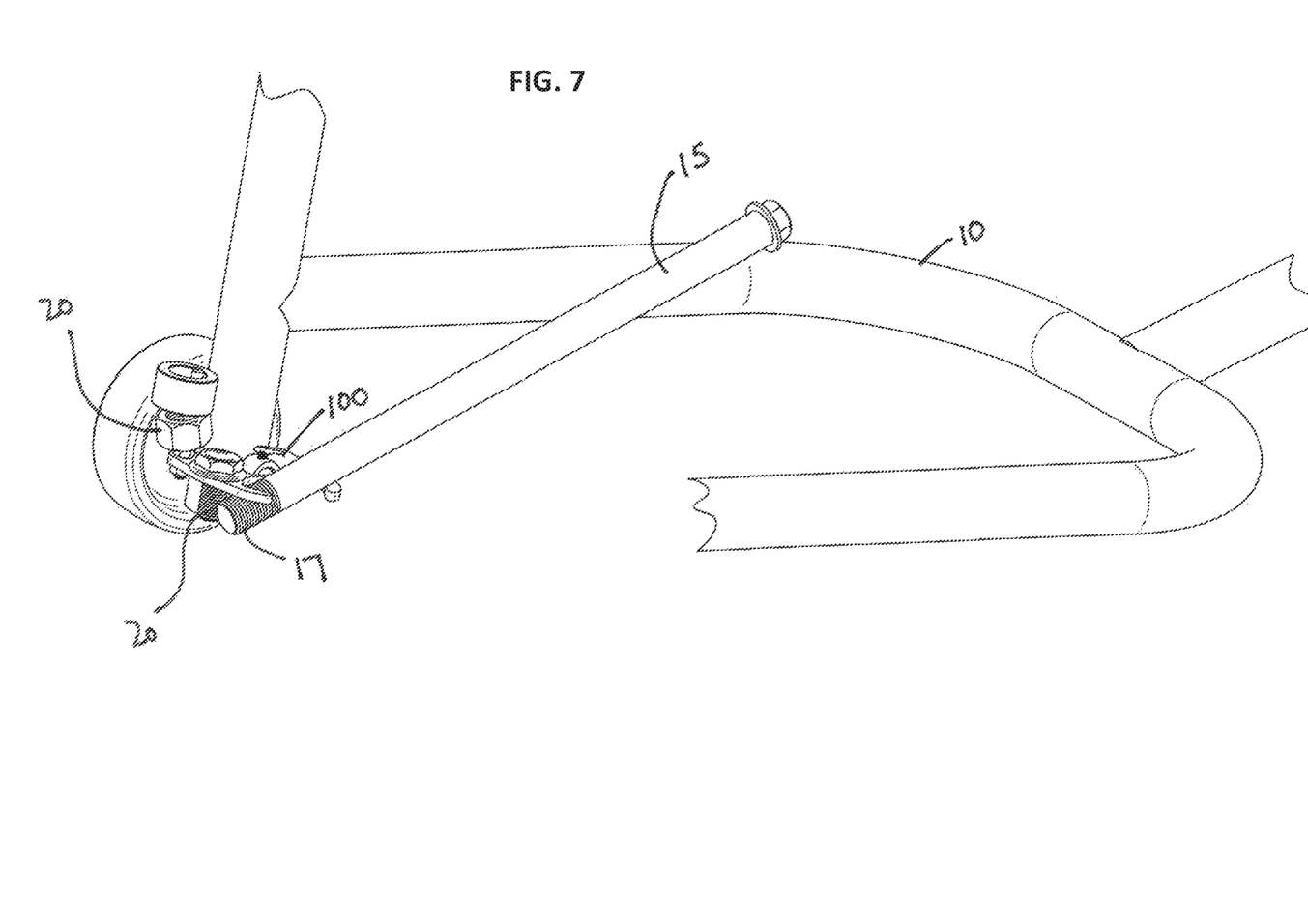
FIG. 7 view showing the axle and hardware held by the axle holder.

As well as holding the motorcycle axle, the axle holder assembly device 100 anticipates the axle-related hardware that will also need to be stored when the motorcycle axle is removed from the motorcycle. These hardware 20 items might include combinations of a nut, lock washer, wheel spacer(s) and/or axle end screw. The nut, lock washer and wheel spacers are all generally hexagonal or cylindrical and open through the center. These items are held with a relatively long screw or pin 160 attached through a hole 165 in a portion 170 of the flat plate 110 of the axle holder assembly device 100. A nut or other fixing device is used to fasten and secure the screw or pin to the flat plate. The motorcycle axle end screw is generally a threaded shaft (screw portion) with a hexagonal end. The invention has a round hole through the plate for insertion of the screw portion of the motorcycle axle end screw.

In addition, the motorcycle holder assembly device 100 may further define the plate 110 to include legs 152 extending outwardly and away from each other. The legs 152 can include an inwardly facing profile 154 that in concert with each other arcuately wrap around a portion of the motorcycle stand adjacent to the cylindrical member 25. This can help in limiting rotational movement of the assembly device around the cylindrical member 25 because when the axle is applying forcing on the motorcycle holder assembly device 100 the legs will bite or dig into the motorcycle stand to oppose the forces.

The invention is embodied as removable for the sake of giving the user the option of using it or not. It could have the exact same functionality if permanently attached to the motorcycle stand via welding or other means.

The invention claimed is:

1. A system comprising:
    a motorcycle stand comprising a cylindrical member extending from the motorcycle stand and the motorcycle stand is configured to lift an end of a motorcycle off a surface for removal of a motorcycle axle and wheel therefrom;
    a motorcycle axle holder assembly device for use with the motorcycle stand, wherein the motorcycle axle holder assembly device comprises:
    a plate;
    a cylindrical section positioned on the plate, the cylindrical section having an opening extending from a first end of the plate and through a longitudinal axis defined by the cylindrical section, and wherein the opening of the cylindrical section is configured to attached to the cylindrical member extending from the motorcycle stand;
    a longitudinal opening defined on a second end of the plate distally positioned from the first end of the plate, and wherein the longitudinal opening is defined has being generally C shaped with a defined base adjacent to the cylindrical section and a pair of arcuate arms extending from the base, and wherein the C shaped longitudinal opening is configured to suspend an end of the motorcycle axle off the surface inserted into the C shaped longitudinal opening; and
    whereby when the cylindrical section is attached to the cylindrical member of the motorcycle stand and the motorcycle axle being removed from the motorcycle is inserted into the C shaped longitudinal opening, a weight of the motorcycle axle simultaneously applies upward force to one of the arcuate arms and a downward force to the other arcuate arm axle to suspend the motorcycle axle inserted there-through off the surface.

2. The motorcycle axle holder assembly device of claim 1, wherein the plate is substantially flat.

3. The motorcycle axle holder assembly device of claim 1, wherein the cylindrical section is positioned about a center portion of the plate.

4. The motorcycle axle holder assembly device of claim 1, wherein the longitudinal opening faces substantially in a direction opposite to the opening in the cylindrical section.

5. The motorcycle axle holder assembly device of claim 1 further comprising a threaded hole laterally defined through a portion of the cylindrical section and a fixing screw sized for insertion through the treaded hole to secure the assembly device onto the cylindrical member.

6. The motorcycle axle holder assembly device of claim 5, wherein the threaded hole is further defined to pass laterally through the diameter of the cylindrical section.

7. The motorcycle axle holder assembly device of claim 1, wherein each arm of the C shape opening further includes a V shape surface edge facing inwardly towards each other to prevent the motorcycle axle from rolling out of the C shape opening.

8. The motorcycle axle holder assembly device of claim 1, wherein the plate further includes an elongated rod extending perpendicular to the cylindrical opening and sized to receive hardware associated with the removal of the motorcycle axle from the motorcycle.

9. The motorcycle axle holder assembly device of claim 8, wherein the elongated rod is removable from the plate and further secured to the plate by having a hole defined through the plate and a fixing device configured to fasten and secure the rod to the plate.

10. The motorcycle axle holder assembly device of claim 1, wherein the plate further includes a pair of legs extending outwardly and away from each other and on either side of the cylindrical section, and wherein the legs further include an inwardly facing profile that in concert with each other arcuately wrap around a portion of the motorcycle stand adjacent to the cylindrical member when the assembly device is attached to the motorcycle stand.

11. A system comprising:
    a motorcycle stand comprising a cylindrical member extending from the motorcycle stand and the motorcycle stand is configured to lift an end of a motorcycle off a surface for removal of a motorcycle axle and wheel therefrom; and
    a motorcycle axle holder assembly device for use with a motorcycle stand, wherein the motorcycle axle holder assembly device comprises:
    a substantially flat plate;
    a tube positioned on the plate, the tube having an opening extending from a first end of the plate and through a longitudinal axis defined by the tube, and wherein the opening of the tube is configured to attached to the cylindrical member extending from the motorcycle stand;
    a threaded hole laterally defined through the tube and a fixing screw sized for insertion through the treaded hole to secure the assembly device onto the cylindrical member;
    a longitudinal opening defined on a second end of the plate distally positioned from the first end of the plate, and wherein the longitudinal opening is defined has being generally C shaped with a defined base adjacent to the tube and a pair of arcuate arms extending from the base, and wherein the C shaped longitudinal opening is configured to suspend an end of the motorcycle axle off the surface inserted into the C shaped longitudinal opening; and
    whereby when the tube is attached to the cylindrical member of the motorcycle stand and the motorcycle axle being removed from the motorcycle is inserted into the C shaped longitudinal opening, a weight of the motorcycle axle simultaneously applies upward force to one of the arcuate arms and a downward force to the other arcuate arm axle to suspend the motorcycle axle inserted there-through off the surface.

12. The motorcycle axle holder assembly device of claim 11, wherein the tube is positioned about a center portion of the plate.

13. The motorcycle axle holder assembly device of claim 11, wherein each arm of the C shape opening further includes a V shape surface edge facing inwardly towards each other to prevent the motorcycle axle from rolling out of the C shape opening.

14. The motorcycle axle holder assembly device of claim 11, wherein the plate further includes an elongated rod extending perpendicular to the cylindrical opening and sized to receive hardware associated with the removal of the motorcycle axle from the motorcycle.

15. The motorcycle axle holder assembly device of claim 14, wherein the elongated rod is removable from the plate and further secured to the plate by having a hole defined through the plate and a fixing device configured to fasten and secure the rod to the plate.

* * * * *